B. & J. A. GALE.
PULVERIZER.
APPLICATION FILED JULY 5, 1916.

1,241,205.

Patented Sept. 25, 1917.
3 SHEETS—SHEET 1.

WITNESSES
John Bell
M. T. Norton

INVENTORS
B. Gale
J. A. Gale

BY
Harold ......
ATT'Y

B. & J. A. GALE.
PULVERIZER.
APPLICATION FILED JULY 5, 1916.
1,241,205.
Patented Sept. 25, 1917.
3 SHEETS—SHEET 2.
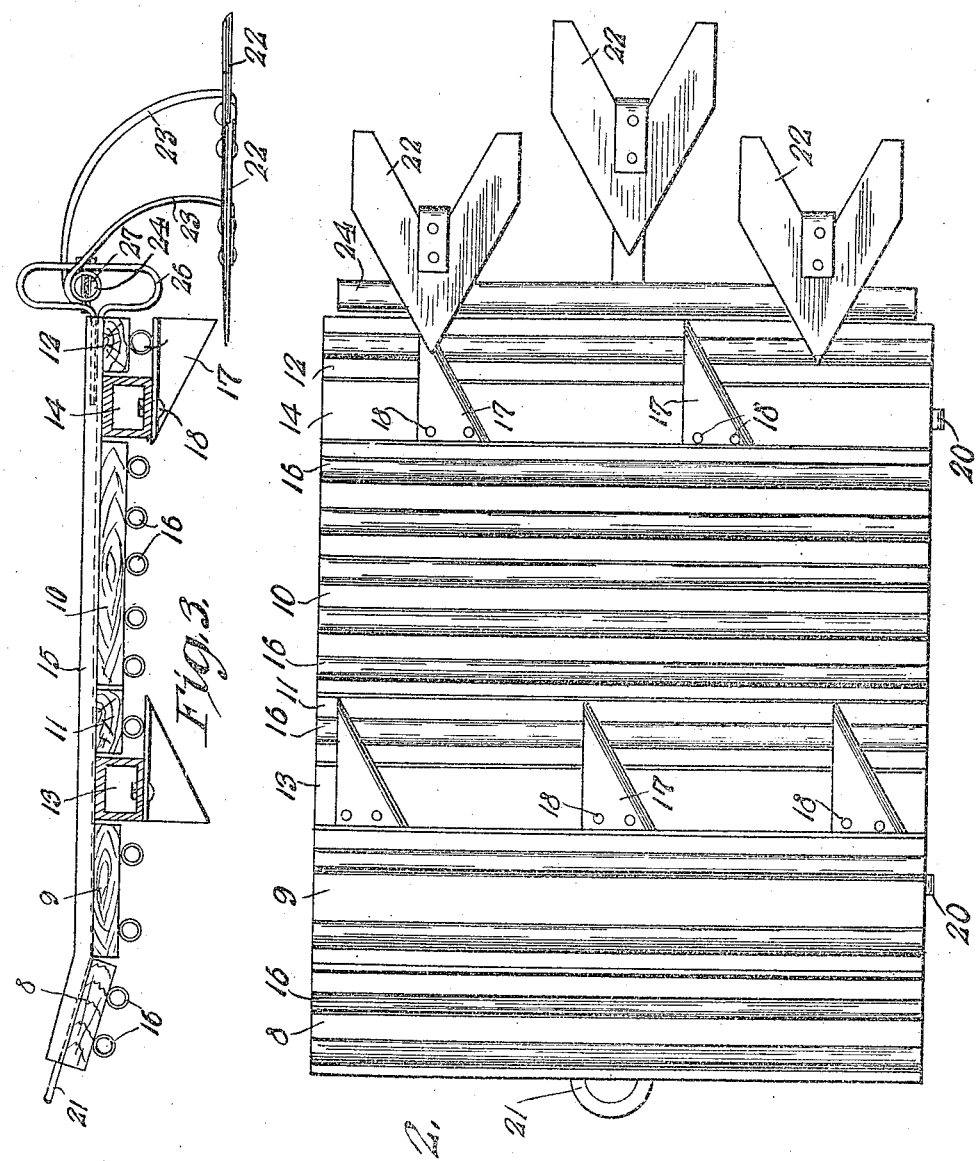
WITNESSES
John Bell
M. J. Norton
INVENTORS
B. GALE
J. A. GALE
By
Harold Heiman
ATT'Y.

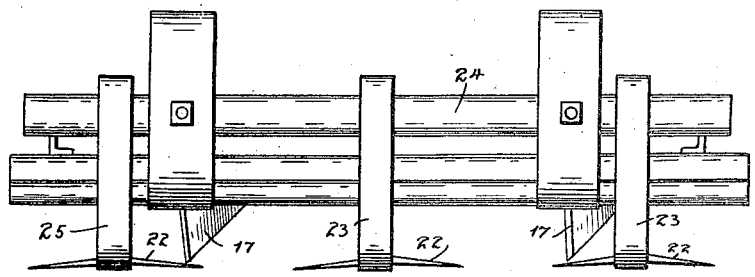
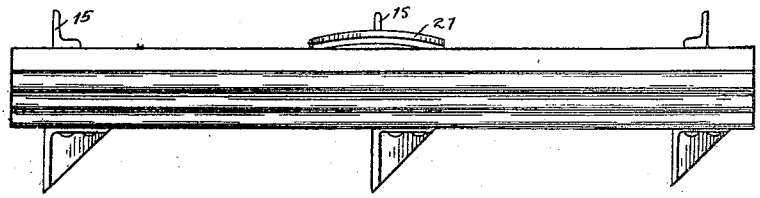
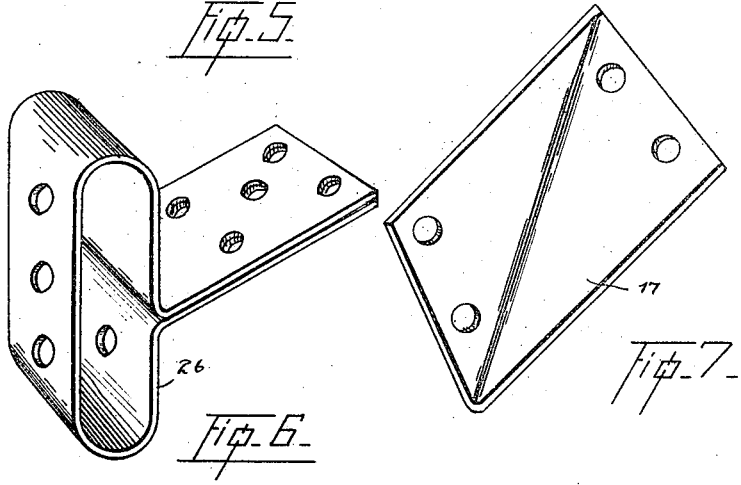

UNITED STATES PATENT OFFICE.

BYRON GALE AND JOSEPH ALLEN GALE, OF STETTLER, ALBERTA, CANADA.

PULVERIZER.

1,241,205.   Specification of Letters Patent.   Patented Sept. 25, 1917.

Application filed July 5, 1916.   Serial No. 107,681.

*To all whom it may concern:*

Be it known that we, BYRON GALE and JOSEPH A. GALE, citizens of the Dominion of Canada, residing at Stettler, in the county of Red Deer, Province of Alberta, and Dominion of Canada, have invented certain new and useful Improvements in Pulverizers, of which the following is a specification.

This invention relates to pulverizers which are made up of sections. Each section is attached to the main center section so that by pulling the center section, all other sections are pulled.

It consists of flat platforms, under which are cutting members. Grubbers are attached at the back of the platform and when the pulverizer is drawn over the ground, it will cause the breakage and evening of all lumps or clogs.

The object of the invention is to provide an agricultural implement, having cutting and grubbing members attached to a platform in such a manner as to be very efficient in breaking of clogs and lumps on rough ground.

With the above and other objects in view which will hereinafter more fully appear, we have invented the device illustrated in the accompanying drawings, in which, Figure 1 shows a perspective top view of the pulverizer.

Fig. 2 shows a perspective bottom view of the pulverizer.

Fig. 3 shows a side elevation of the pulverizer.

Fig. 4 shows a perspective back end view of the pulverizer.

Fig. 5 shows a perspective front end view of the pulverizer.

Fig. 6 shows a perspective view of one of the regulators.

Fig. 7 shows a perspective view of one of the cutters.

Figure 1:
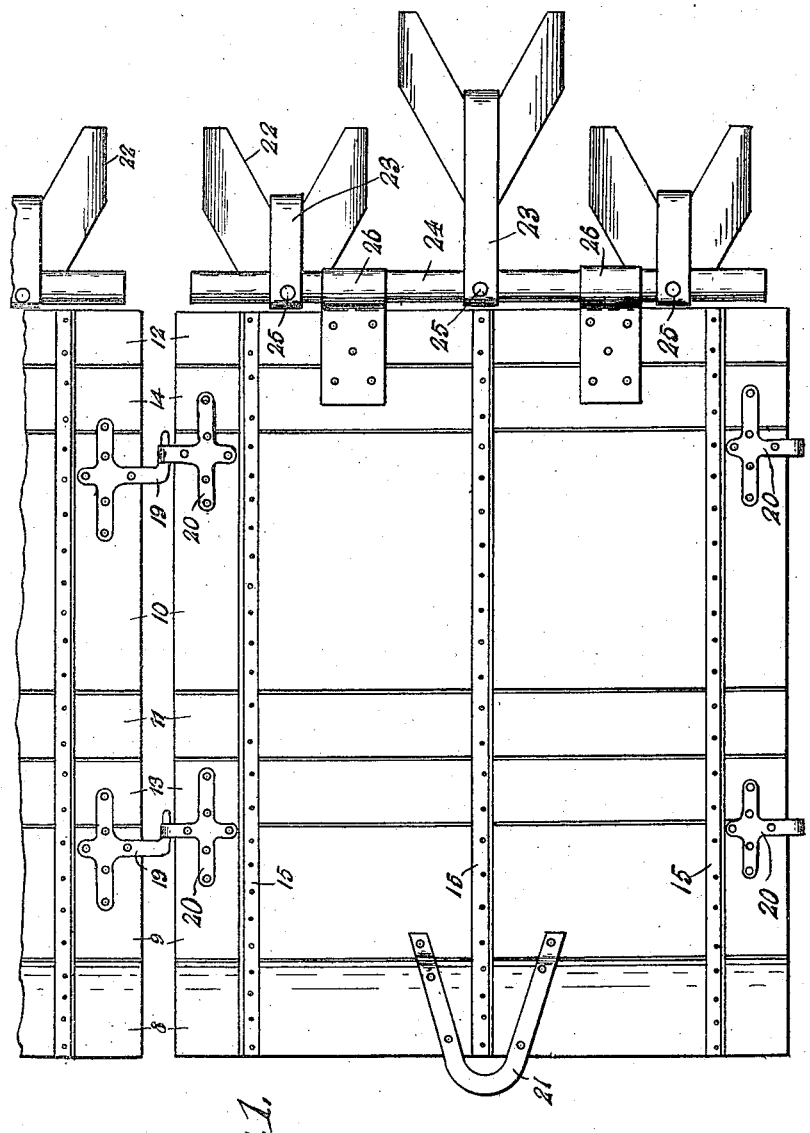

Referring now to the drawing in which like characters of reference designate similar parts, 8, 9, 10, 11 and 12 are flat rectangular members, preferably planks of wood. 13 and 14 are square piping. 8, 9, 10, 11, 12, 13, 14 are all of the same length and their top surfaces are even. They are all held in position by means of the angle-iron strips 15, by means of rivets or bolts. These members when thus joined together make a platform. The two square lengths of piping 13 and 14 are deeper than the other members of the platform, by the width of the cylindrical piping 16. A number of lengths of the cylindrical piping 16 are riveted or bolted to the under side of members 8, 9, 10, 11 and 12.

17 are the cutting members and are bolted to the square pipings 13 and 14. These cutting members 17 are formed from flat rectangular pieces of steel or other such material. The two longer sides are sharpened and the pieces are bent diagonally so that one-half is at right angles to the other half. Near each end two holes are drilled to allow the bolts 18 to go through to fasten the cutting members to the square pipings 13 and 14.

These cutting members 17 may be of any number to each section of the pulverizer. They act as a plow share, to turn over the soil and at the same time cut and break up any clogs. Each cutting member 17 has two sharpened sides and when one gets dull the other side can be used.

The pulverizer is made up of a number of sections. The sections are attached together by means of a set of hooks and eyes. The hooks 19 are attached to the inner side of the section which is being attached on. The hooked end is turned back. This hooked end engages in the eyes 20 which are securely fastened to the other sides of the sections to which the other sections are attached. On the center section eye members 20 are on both sides and this section is provided with a loop member 21 at the front adapted for attaching whiffletrees to the pulverizer or such power-operating means as may be desired.

The angle-iron strips 15 are bent up slightly at the front, so as to cause the plank member 8 and piping 16 attached thereto, to be tilted up. This will allow the soil to roll under the pulverizer instead of blocking in front of it.

22 are grubbers which have the curved flat-springs 23 attaching them to the cross-pipe 24 by means of the bolts 25. This cross-pipe is mounted in the guides 26. These guides 26 have their ends bolted to members 12 and 14 and the looped portion is held in an upright position. The looped portion has orifices in pairs so that a bolt 27 can pass through the guide 26, through the cross-pipe 24 and then through the guide 26 again.

This cross-pipe can be bolted at various positions in the guides 26 so that the grubbers 22 will sink into the soil any desired depth.

From the foregoing description, it is thought to be obvious that a pulverizer constructed in accordance with our invention is of an extremely simple and comparatively inexpensive nature and is particularly well adapted for use by reason of the convenience and facility with which it may be assembled, and it will also be obvious that our invention is susceptible of some changes and modification without material departure from the principles and spirit thereof and for this reason we do not wish to be understood as limiting ourselves to the precise arrangement and formation of the several parts herein shown in carrying out our invention in practice.

What we claim as new, is:

A pulverizer, consisting of a number of sections, each section consisting of a platform formed of planking members and square piping attached together by means of angle-iron strips, said platform being turned up at its front end, said platform having piping attached to its under side, said square-piping having cutting members attached to their under side, said cutting members being formed from rectangular pieces of metal and being bent diagonally so that one-half is at right angles to the other half and having their long sides sharpened, the front of said platform being provided with a looped attachment member, a cross-piping carrying a number of curved flat-springs, each of said flat-springs having a grubber-foot attached to its end, said cross-piping being mounted in guides attached to the rear of said platform, said sections being connected together by means of hook and eye members.

In testimony whereof, we hereunto affix our signatures in presence of two witnesses.

Stettler, 31st December, 1915.

BYRON GALE.
JOSEPH ALLEN GALE.

In the presence of—
JAMES ALBERT LANE,
CHARLES MONTEITH.

Copies of this patent may be obtained for five cents each, by addressing the "Commissioner of Patents, Washington, D. C."